(12) United States Patent
Ramaswamy et al.

(10) Patent No.: US 9,379,417 B2
(45) Date of Patent: Jun. 28, 2016

(54) LITHIUM SULFUR BATTERY CATHODE ELECTRODE SURFACE TREATMENT DURING DISCHARGE

(71) Applicant: Nissan North America, Inc., Franklin, TN (US)

(72) Inventors: Nagappan Ramaswamy, Farmington Hills, MI (US); Peter Aurora, Ann Arbor, MI (US); Gregory DiLeo, Ann Arbor, MI (US); Xiaoguang Hao, Ann Arbor, MI (US); Taehee Han, Farmington Hills, MI (US); Rameshwar Yadav, Farmington Hills, MI (US); Ellazar Niangar, Farmington Hills, MI (US); Kenzo Oshihara, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 158 days.

(21) Appl. No.: 14/171,971

(22) Filed: Feb. 4, 2014

(65) Prior Publication Data

US 2015/0221991 A1 Aug. 6, 2015

(51) Int. Cl.
| | |
|---|---|
| *H01M 10/44* | (2006.01) |
| *H01M 10/42* | (2006.01) |
| *H02J 7/00* | (2006.01) |
| *H01M 10/052* | (2010.01) |

(52) U.S. Cl.
CPC ............ *H01M 10/44* (2013.01); *H01M 10/052* (2013.01); *H01M 10/42* (2013.01); *H01M 10/4242* (2013.01); *H02J 7/00* (2013.01); *H02J 7/0063* (2013.01); *H02J 2007/0067* (2013.01)

(58) Field of Classification Search
CPC . H01M 10/44; H01M 10/42; H01M 10/4242; C25F 1/00; H02J 7/0063; H02J 2007/0067
USPC ........................................ 205/641, 644, 646
See application file for complete search history.

(56) References Cited

U.S. PATENT DOCUMENTS

| | | | |
|---|---|---|---|
| 7,786,702 B1 | 8/2010 | Chait et al. | |
| 2006/0220616 A1 | 10/2006 | Okuno | |
| 2014/0123477 A1* | 5/2014 | Safont Sempere .. | H01M 4/0447 29/623.5 |

FOREIGN PATENT DOCUMENTS

| | | | | |
|---|---|---|---|---|
| CA | WO 2013142964 A1 * | 10/2013 | .......... | H01M 10/425 |
| EP | 2124312 A2 | 11/2009 | | |
| EP | 1618643 B2 | 3/2013 | | |
| JP | 04801304 B2 | 10/2011 | | |

* cited by examiner

*Primary Examiner* — Nicholas A Smith
(74) *Attorney, Agent, or Firm* — Young Basile Hanlon & MacFarlane P.C.

(57) ABSTRACT

Methods and apparatus are provided for discharging a Li—S battery having at least one battery unit comprising a lithium-containing anode and a sulfur-containing cathode with an electrolyte layer there between. One method comprises electrochemically surface treating the sulfur-containing cathode during discharge of the battery. A method of electrochemically surface treating a cathode of a lithium-sulfide battery comprises applying at least one oxidative voltage pulse during a pulse application period while the lithium-sulfur battery discharges and controlling pulse characteristics during the pulse application period, the pulse characteristics configured to affect a morphology of lithium sulfide forming on the sulfur-containing cathode during discharge.

17 Claims, 6 Drawing Sheets

LITHIUM SULFUR BATTERY CATHODE ELECTRODE SURFACE TREATMENT DURING DISCHARGE

TECHNICAL FIELD

This disclosure relates to methods for improving the cell life of a lithium sulfur battery, and in particular, methods for improving dissolution of electronically resistive lithium sulfide deposits that degrade cell performance.

BACKGROUND

The lithium-sulfur battery (Li—S battery) is a rechargeable battery, notable for its high energy density. Li—S batteries may be a successful alternative to lithium-ion cells because of their higher energy density and reduced cost from the use of sulfur. However, Li—S batteries do present some challenges that must be addressed before the advantages of Li—S batteries can be fully appreciated. For example, during discharge, a film-like insulating layer of lithium sulfide can form on the cathode. During subsequent charging, this insulating layer leads to high ohmic resistance and voltage losses.

SUMMARY

Disclosed herein are methods and an apparatus for discharging a Li—S battery having at least one battery unit comprising a lithium-containing anode and a sulfur-containing cathode with an electrolyte layer there between. One method comprises electrochemically surface treating the sulfur-containing cathode during discharge of the battery.

A method of electrochemically surface treating a cathode of a lithium-sulfide battery comprises applying at least one oxidative voltage pulse during a pulse application period while the lithium-sulfur battery discharges and controlling pulse characteristics during the pulse application period, the pulse characteristics configured to affect the morphology of lithium sulfide forming on the sulfur-containing cathode during discharge.

An apparatus for discharging a lithium-sulfur battery having at least one unit cell comprising a lithium-containing anode and a sulfur-containing cathode with an electrolyte layer there between as disclosed herein comprises a memory and a processor configured to execute instructions stored in the memory to electrochemically treat a surface of the sulfur-containing cathode during discharge of the battery.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Unlike in a lithium ion battery, lithium is not intercalated inside another substance in the Li—S battery; rather, lithium metal is the negative electrode. Sulfur is used as the positive electrode active material. Because sulfur is well known as an insulator, the sulfur is typically combined with a material having good conductivity, such as carbon. A carbon coating can provide the missing electroconductivity. Carbon nanofibers can provide an effective electron conduction path and structural integrity.

Chemical processes in the Li—S cell include lithium dissolution from the anode surface (and incorporation into alkali metal polysulfide salts) during discharge, and reverse lithium plating to the anode while charging. Because the lithium ions are not intercalated in the anode and cathodes as in the conventional lithium ion cell, the Li—S cell allows for a much higher lithium storage density. The lithium, during discharge, is transported across the electrolyte from the anode to the cathode and reacts with sulfur to undergo the following reaction, with a reverse reaction occurring when the cell is charged:

$$S_8 \rightarrow Li_2S_6 \rightarrow Li_2S_4 \rightarrow Li_2S_3 \rightarrow Li_2S_2 \rightarrow Li_2S$$

During discharge, lithium undergoes oxidation on the anode and subsequently reacts with the sulfur on the cathode to form lithium sulfide, $Li_2S$. Lithium sulfide is an electronically insulating and chemically insoluble species. Discharge of the battery to at least 50% state of charge (SOC) can lead to the formation of a film-like insulating layer of lithium sulfide on the cathode. Lithium sulfide particles begin collecting on the cathode during the discharge cycle, and tend to agglomerate early in the discharge cycle before forming the film-like insulating layer later in the discharge cycle. The collection of lithium sulfide on the surface of the cathode may irreversibly deposit on the cathode, causing permanent capacity degradation.

During a subsequent charge process, the high electronic resistivity of the lithium sulfide species leads to high ohmic resistance and voltage losses, resulting in poor coulombic efficiency, defined as follows:

$$\eta_c = \frac{Q_{out}}{Q_{in}}$$

where $\eta_c$ is the coulombic efficiency, $Q_{out}$ is the amount of charge that exits the battery during the discharge cycle and $Q_{in}$ is the amount of charge that enters the battery during the charging cycle.

As the insulating film develops, less lithium and sulfur are available as active species, leading to exponentially decreasing capacity.

Conventional discharge protocols involve the application of constant current loads to the battery, during which the film-like insulating layer forms. Lithium sulfide formations on the cathode are weaker before the film is formed (i.e., prior to reaching 50% SOC), and get stronger as the discharge cycle progresses. Once the film-like insulating layer is formed, it is more difficult to dissolve due to its agglomerated structure. More energy is needed to weaken the structure and break through the structure.

To interrupt the formation of the film-like insulating layer during discharge of the battery, the methods and apparatus disclosed herein condition the surface of the cathode during the discharge cycle to weaken the physical structure of lithium sulfide, thus preventing formation of the film-like insulating layer and strong attachment to the cathode. The methods and apparatus disclosed utilize the application of one or more oxidative voltage pulses during discharge. The one or more oxidative voltage pulses are superimposed during discharge such that discharge and normal operation of the battery is unaffected. The superimposition of the one or more oxidative voltage pulses affects the morphology of the lithium sulfide particles and the lithium sulfide film-like insulating layer to enhance the dissolution and reactivity of the lithium sulfide species, thereby improving the Li—S battery's coulombic efficiency, enhancing the battery's rate capability, increasing battery cycling life, decreasing charge cycle duration and reclaiming active sulfur particles.

Figure 1:
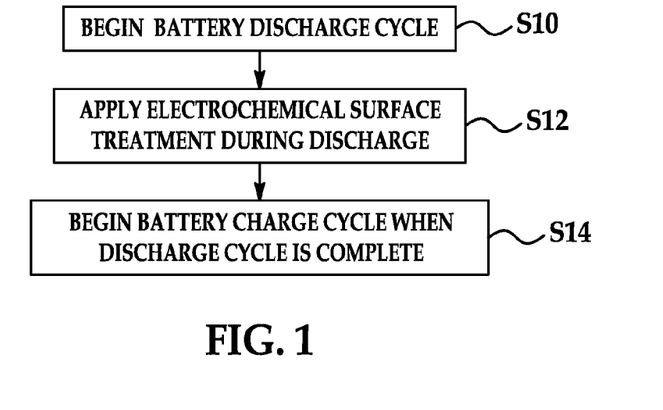
FIG. 1 is a flow diagram of a method of discharging a Li—S battery as disclosed herein.

FIG. 1 is a flow diagram of a method of discharging a Li—S battery as taught herein. The Li—S battery has at least one unit cell comprising a lithium-containing anode and a sulfur-containing cathode with an electrolyte layer there between. After the battery discharge cycle has commenced in step S10, the sulfur-containing cathode of the Li—S battery is electrochemically surface treated during discharge of the battery in step S12 to affect the morphology of the lithium sulfide particles and prevent the formation of lithium sulfide film-like insulating layer. When the battery discharge cycle is complete, the battery charge cycle commences in step S14. The charge cycle may be initiated when, for example, the vehicle is connected to a battery charger.

Figure 2:
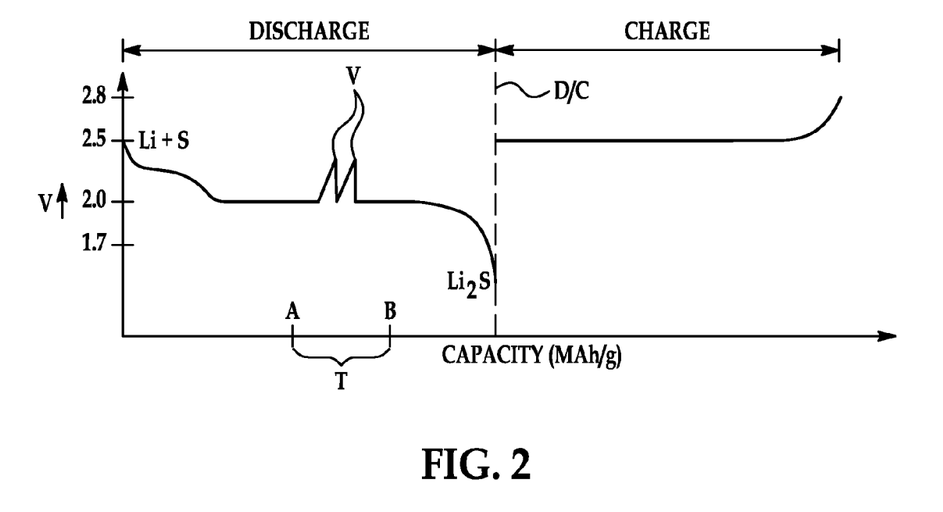
FIG. 2 is a schematic diagram of a discharge cycle of a Li—S battery using a method disclosed herein.

FIG. 2 is a schematic diagram illustrating the electrochemical surface treatment of the sulfur-containing cathode during the discharge cycle. As seen in FIG. 2, as the battery discharges, the battery capacity decreases and Li and S form $Li_2S$. Line D/C represents the completion of the discharge cycle and the initiation of the charge cycle. The voltage provided in FIG. 2 is provided by way of illustration and is not meant to be limiting. The electrochemical surface treatment of the sulfur-containing cathode is illustrated in FIG. 2 with two oxidative voltage pulses V superimposed during discharge of the battery.

Figure 3:
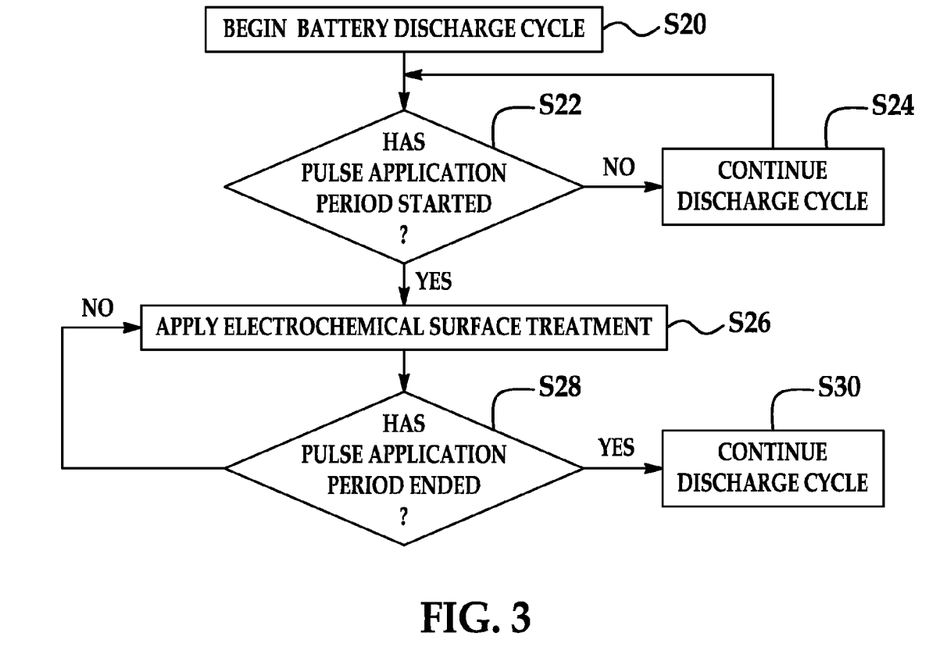
FIG. 3 is a flow diagram of another method of discharging a Li—S battery as disclosed herein.

FIG. 3 is a flow diagram of an embodiment of a method of discharging a Li—S battery. The battery discharge cycle begins in step S20. A determination is made in step S22 if a pulse application period has started. If the pulse application period has not started, the battery discharge cycle continues in step S24 as a constant current discharge. If the pulse application period has begun, electrochemical surface treatment of the sulfur-containing cathode is applied in step S26. When it is determined in step S28 that the pulse application period has elapsed, the constant current discharge cycle is completed in step S30. Referring back to FIG. 2, the pulse application period T is illustrated as occurring between depths of charge A and B. A and B can be, for example, depths of discharge of 50% and 80%, respectively. However, the range can be broader or narrower as determined by one skilled in the art. The pulse application period T can be more than one period during discharge. As a non-limiting example, the pulse application period T can comprise a first period and a subsequent second period, between which constant current discharge occurs.

The pulse application period T can be predetermined based on prior evaluations of Li—S batteries. The pulse application period T can be constant throughout the battery life or can be programmed to change based on the number of discharge and charge cycles the battery has experienced. For example, as the number of cycles experienced by the battery increases, the pulse application period T can increase. The Li—S battery system can include one or more sensors that provide battery information to a controller that can adjust the pulse application period T based on the output of the sensor or sensors. As a non-limiting example, the coulombic efficiency of the battery can be calculated by the controller and the pulse application period T extended as the efficiency drops.

The method can also comprise controlling pulse characteristics during the pulse application period, the pulse characteristics configured to affect the morphology of lithium sulfide forming on the sulfur-containing cathode during discharge. Characteristics of the applied voltage pulses can be manipulated to optimize the dissolution of the lithium sulfide particles while avoiding disruption of the discharge cycle and minimizing any negative effects on the battery cells. The pulse characteristics include a number of pulses, a frequency of pulses, a pulse duration, a peak voltage, a pulse shape, a peak duration and a valley duration. One or more pulse characteristics can be manipulated to obtain the desired results.

Figure 4:
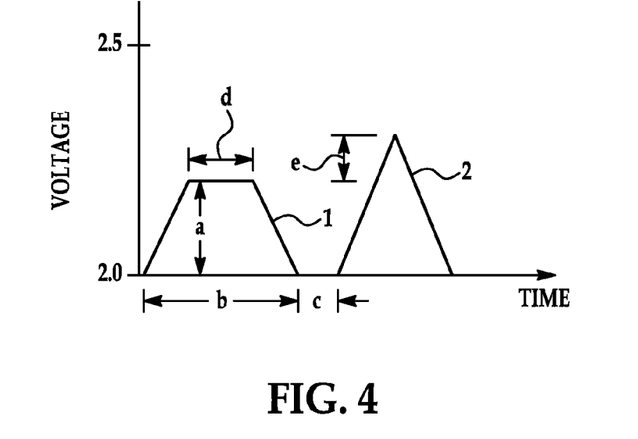
FIG. 4 is a schematic diagram of oxidative pulse characteristics.

FIG. 4 illustrates the different pulse characteristics. As shown in FIG. 4, two pulses 1, 2 are illustrated. The peak voltage for each pulse is represented by "a", pulse duration is represented by "b", valley duration is represented by "c", peak duration is represented by "d" and change in peak is represented by "e".

Figure 5A:
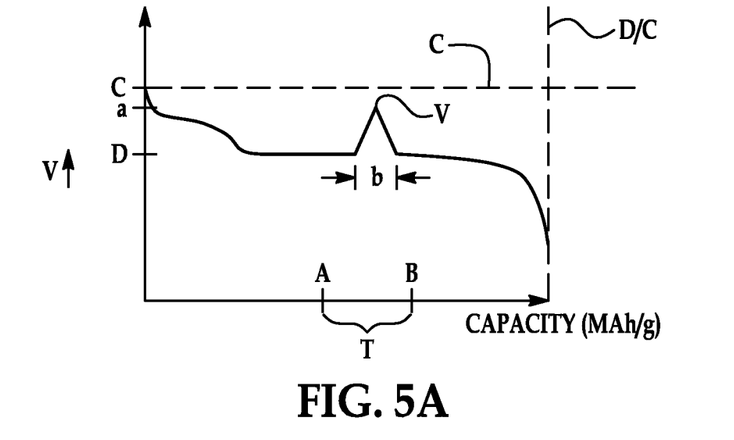
FIGS. 5A-5C are schematic diagrams of examples of controlling oxidative pulse characteristics to affect morphology of the lithium sulfide particles and surface morphology of the film-like insulating layer.
Figure 5B:
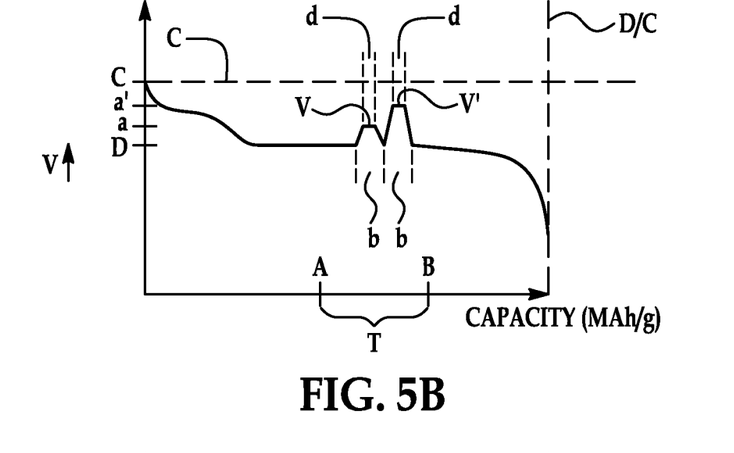
Figure 5C:
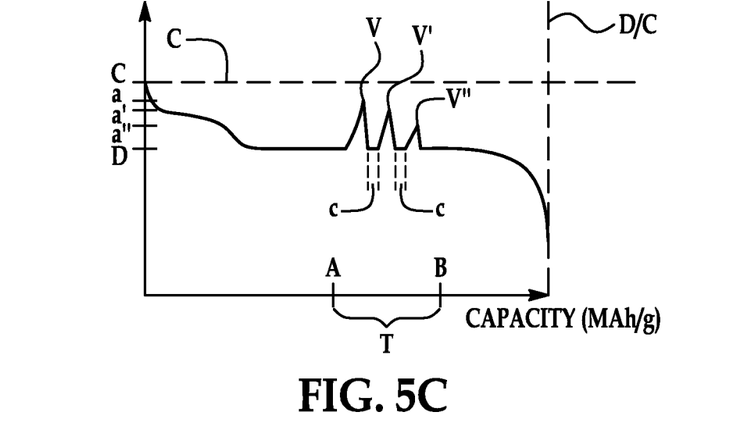

FIGS. 5A-5C are illustrations of different pulse characteristics that can be applied during the pulse application period T and are provided as non-limiting examples only. FIG. 5A illustrates a single oxidative voltage pulse V applied during the pulse application period T with a peak voltage "a" and a pulse duration "b". The peak voltage "a" is less than the constant current charging voltage C.

In FIG. 5B, the peak voltages "a", "a'" gradually increases, in succession, for each of the two pulses V, V' applied during the pulse application period T. Each peak voltage "a", "a'" is less than the constant current charging voltage C. The pulse characteristics in FIG. 5B are also controlled to apply an extended peak voltage "a", "a'" for each oxidative voltage pulse V, V' for a peak duration "d" of time before the peak voltage "a, a'" is decreased. Although both the peak duration "d" and the pulse duration "b" are shown as the same for each voltage pulse V, V', one or both of the peak duration "d" and the pulse duration "b" can be different for one or all of the voltage pulses. FIG. 5B also illustrates controlling pulse characteristics to apply a subsequent oxidative voltage pulse V' immediately after a preceding oxidative pulse V has returned to a discharge voltage D.

In FIG. 5C, the peak voltage "a, a', a'" gradually decreases, in succession, for each of the three pulses V, V', V'" applied during the pulse application period T. Again, each peak voltage "a, a', a'" is less than the constant current charging voltage C. In FIG. 5C, the pulse characteristics are controlled to apply a subsequent oxidative voltage pulse V' a duration of time c after a preceding oxidative pulse V has returned to the discharge voltage D.

Figure 7:
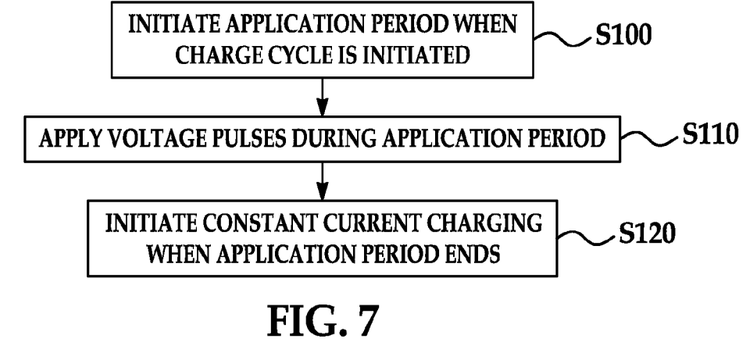
FIG. 7 is a flow diagram of a method of charging a Li—S battery as disclosed herein.

In addition to surface conditioning the cathode during discharge, the voltage pulses can be applied to the battery during the charge cycle to dissolve remaining lithium sulfide particles after the surface conditioning. FIG. 7 is a flow diagram of a method of charging a Li—S battery as taught herein. The method provides controlled application of voltage pulses at the beginning of the charging process. In step S100, an application period is initiated when a charge cycle of the Li—S battery is initiated. The charge cycle is typically initiated directly after a discharge cycle is complete, which is typically when the battery is about 20% state-of-charge. Initiation of the charge cycle can occur when, for example, the vehicle is connected to a charger. In step S110, during the application period, voltage pulses are provided to the Li—S battery. The voltage pulses are less than the constant current charging voltage. In step S120, constant current charging is initiated after the application period has elapsed.

Figure 8A:
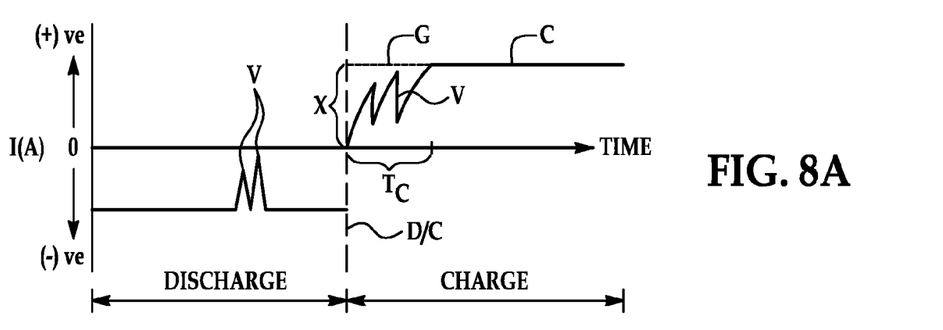
FIG. 8A is a diagram of current versus time for a Li—S battery during discharging and charging using the methods disclosed herein.
Figure 8B:
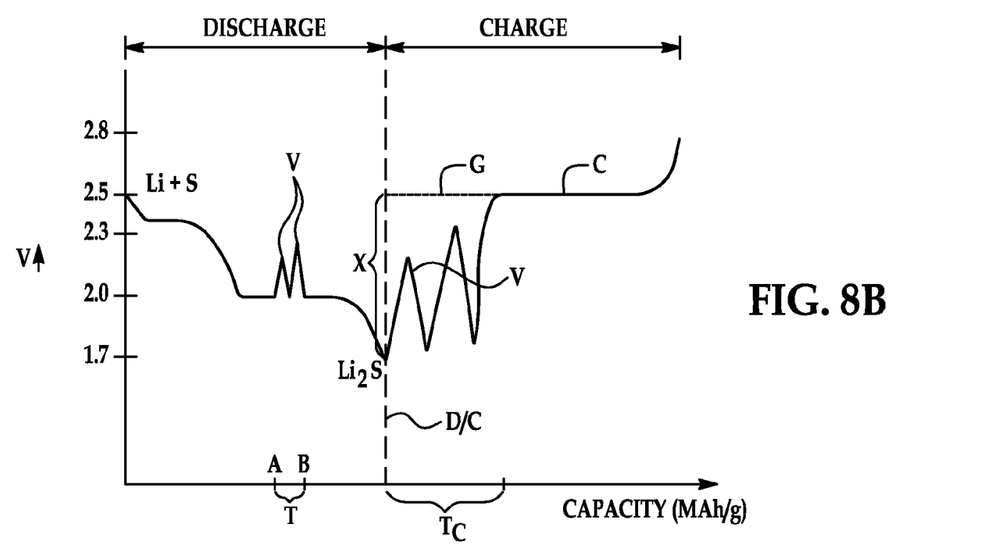
FIG. 8B is a diagram of voltage versus capacity for the Li—S battery during discharging and charging using the methods disclosed herein.

FIGS. 8A and 8B illustrate the application of voltage during the charge/discharge cycles and the battery capacity over time, respectively. As seen in FIGS. 8A and 8B, as the battery discharges, the battery capacity decreases and Li and S form $Li_2S$. Line D/C represents the completion of the discharge cycle and the initiation of the charge cycle. The broken line G in both FIGS. 8A and 8B represent the constant charge and the jump in battery capacity that occurs during conventional charging. As shown in FIG. 8A, conventionally charging at a constant current occurs until the battery has reached its maximum charge capacity. As shown in FIG. 8B, high ohmic voltage loss X occurs upon start of the constant current charging due to the electronically insulating $Li_2S$ film on the cathode. The voltage provided in FIG. 8B is provided by way of illustration and is not meant to be limiting.

The application period $T_C$ begins at line D/C, when discharge is complete. Rather than initiating charging at the constant current, voltage pulses V are applied during the application period $T_C$. When the application period $T_C$ is complete, constant current charging is initiated.

The application period $T_C$ can be predetermined based on prior evaluations of Li—S batteries. The application period $T_C$ can be constant throughout the battery life or can be programmed to change based on the number of discharge and charge cycles the battery has experienced. For example, as the number of cycles experienced by the battery increases, the application period $T_C$ can increase. The Li—S battery system can include one or more sensors that provide battery information to a controller that can adjust the application period Tc based on the output of the sensor or sensors. As a non-limiting example, the coulombic efficiency of the battery can be calculated by the controller and the application period T extended as the efficiency drops.

The voltage pulses V applied during the application period $T_C$ further weaken and/or dissolve the lithium sulfide particles remaining after discharge and the surface conditioning occurring during discharge, further facilitating the dissolution of the lithium sulfide. It should be noted that the anode chemistry is unchanged during the application period. Characteristics of the applied voltage peaks can be manipulated to optimize the dissolution of the lithium sulfide particles while minimizing any negative effects on the battery cells. The pulse characteristics include a number of pulses, a frequency of pulses, a pulse duration, a peak voltage, a pulse shape, a peak duration, a valley duration and a valley voltage. One or more pulse characteristics can be manipulated to obtain the desired results.

Figure 9:
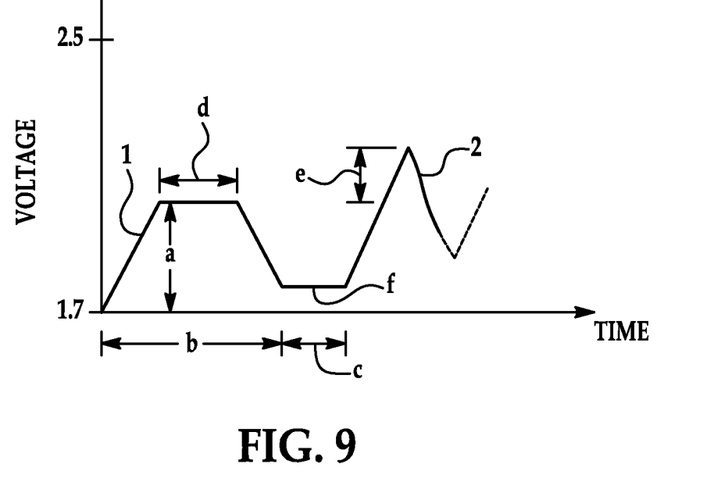
FIG. 9 is a schematic diagram illustrating pulse characteristics.

FIG. 9 illustrates the different pulse characteristics and is similar to FIG. 4. As shown in FIG. 9, two pulses 1, 2 are illustrated. The peak voltage for each pulse is represented by "a", pulse duration is represented by "b", valley duration is represented by "c", peak duration is represented by "d", change in peak is represented by "e" and valley voltage is represented by "f". Examples of different pulse characteristics include the following and can be applied in any feasible combination.

The peak voltage "a" of a multiple of voltage peaks can be the same or can gradually increase, in succession, for each of the pulses applied during the application period $T_C$. Each peak voltage is less than the constant current charging voltage C. The pulse characteristics can be controlled to apply an extended peak voltage "a" for each voltage pulse for a peak duration "d" of time before the peak voltage "a" is decreased. Both the peak duration "d" and the pulse duration "b" can be the same for each voltage pulse, or one or both of the peak duration "d" and the pulse duration "b" can be different for one or all of the voltage pulses. Pulse characteristics can also be controlled so that a valley voltage "f" of each valley between adjacent voltage pulses is gradually increased in succession or the valley voltage "f" can be the same between voltage pulses. Each valley between adjacent voltage peaks can be maintained at a constant voltage for a valley duration "c" of time. The valley voltage "f" can be greater than or equal to the discharged voltage D of the battery, illustrated in FIG. 9 as 1.7 V by means of example.

Figure 6:
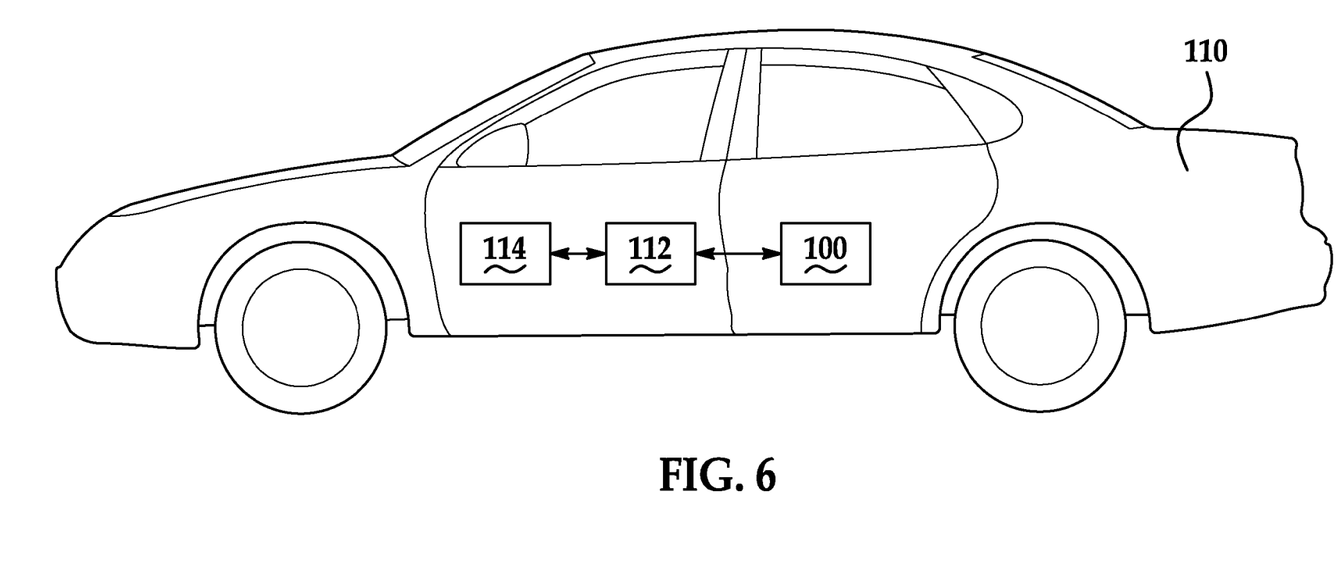
FIG. 6 is a schematic of an apparatus for discharging a lithium sulfide battery as disclosed herein.

Also disclosed herein is an apparatus for discharging a Li—S battery having at least one unit cell comprising a lithium-containing anode and a sulfur-containing cathode with an electrolyte layer there between. The apparatus 100 is illustrated in FIG. 6 as a computing device having a memory and a processor configured to execute instructions stored in the memory. The apparatus 100 is illustrated as being on board the vehicle 110 and may be included in a telematics unit of the vehicle 110 as a non-limiting example. However, it is understood that the apparatus 100 may be located remote from the vehicle 110 and receiving and transmitting information wirelessly with the vehicle 110, through, for example, the telematics unit.

The apparatus 100 performs the methods described herein by communicating with the battery system 112 to apply the electrochemical surface treatment of the sulfur-containing cathode. The battery system 112 applies oxidative voltage pulses to the battery 114 during the pulse application period T during the battery 114 discharge cycle. The battery charging system 112 is shown on-board vehicle 110 and can be an on-board energy source, such as another battery or a capacitor. The battery or capacitor can be charged, for example, by an on-board regenerative braking system or an off-board charger. The oxidative voltage pulses are less than a constant current charging voltage C. The apparatus 100 communicates with the battery charging system 112 to complete constant current discharging after the pulse application period T has elapsed. The pulse characteristics of the oxidative voltage pulses are also controlled by the apparatus 100 as described above. It is understood that the apparatus 100 can be a part of the battery system 112 if desired, or can be a separate unit as illustrated.

The apparatus 100 can also perform the charging methods described herein by communicating with the battery charging system 112 to apply voltage pulses to the battery 114 for an application period, the application period initiated when a battery charge cycle is initiated. The battery charging system 112 is shown on-board vehicle 110 and can be an on-board energy source, such as another battery or a capacitor. The battery or capacitor can be charged, for example, by an on-board regenerative braking system or an off-board charger. The battery charging system 112 can also be an off-board charger to which the vehicle battery 114 is connected when charging is desired or required. The apparatus 100 communicates with the battery charging system 112 to maintain voltage pulses less than a constant current charging voltage and to control the pulse characteristics of the voltage pulses as described above. The apparatus 100 communicates with the battery charging system 112 to initiate constant current charging after the application period is complete.

Implementations of computing devices to carry out the processes (and the algorithms, methods, instructions, etc., stored thereon and/or executed thereby as described herein) may be realized in hardware, software, or any combination thereof. The hardware can include, for example, computers, IP cores, ASICs, PLAs, optical processors, PLCs, microcode, microcontrollers, servers, microprocessors, digital signal processors or any other suitable circuit. In the claims, the term "processor" should be understood as encompassing any of the foregoing hardware or other like components to be developed, either singly or in combination.

In one example, a computing device may be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein. Further, some or all of the teachings herein may take the form of a computer program product accessible from, for example, a tangible (i.e., non-transitory) computer-usable or computer-readable medium. A computer-usable or computer-readable medium is any device that can, for example, tangibly contain, store, communicate, or transport the program for use by or in connection with any processor. The medium may be an electronic, magnetic, optical, electromagnetic or semiconductor device, for example.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of interrupting lithium-sulfide morphology during normal cycling of a lithium-sulfur battery having at least one battery unit comprising a lithium-containing anode and a sulfur-containing cathode with an electrolyte layer there between, the method comprising:
   during a pulse application period of a discharge cycle occurring through normal use of the lithium sulfur-battery, superimposing at least one oxidative voltage pulse onto a discharge voltage at the time of the pulse application period to electrochemically treat a surface of the sulfur-containing cathode during discharge of the battery, wherein the oxidative voltage pulse during the pulse application period is less than a constant current charging voltage.

2. The method of claim 1, wherein the pulse application period is only between depths of discharge of 50% to 80%.

3. The method of claim 1, wherein the discharge cycle of the battery is unaffected by the at least one superimposed oxidative voltage pulse.

4. The method of claim 1, further comprising:
   controlling pulse characteristics during the pulse application period, the pulse characteristics configured to affect a morphology of lithium sulfide forming on the sulfur-containing cathode during discharge.

5. The method of claim 4, wherein the pulse characteristics include one or more of a number of pulses, a frequency of pulses, a pulse duration, a peak voltage, a peak duration, a pulse shape and a valley duration.

6. The method of claim 4, wherein the at least one oxidative voltage pulse is a plurality of oxidative voltage pulses and controlling pulse characteristics comprises gradually increasing or decreasing the peak voltage of each of the oxidative voltage pulses, each peak voltage being less than a constant current charging voltage.

7. The method of claim 4, wherein controlling pulse characteristics comprises applying the peak voltage of the at least one oxidative voltage pulse for a duration of time before the peak voltage is decreased.

8. The method of claim 4, wherein the at least one oxidative voltage pulse is a plurality of oxidative voltage pulses and controlling pulse characteristics comprises applying a subsequent oxidative voltage pulse immediately after a preceding oxidative pulse has returned to a discharge voltage.

9. The method of claim 4, wherein the at least one oxidative voltage pulse is a plurality of oxidative voltage pulses and controlling pulse characteristics comprises applying a subsequent oxidative voltage pulse a duration of time after a preceding oxidative pulse has returned to a discharge voltage.

10. The method of claim 4, wherein the pulse characteristics are controlled to optimize dissolution of lithium sulfide formed at the sulfur-containing cathode of the battery.

11. A method of electrochemically surface treating a cathode of a lithium-sulfide battery, the method comprising:
    commencing a discharge cycle during normal operation of the lithium sulfide battery;
    applying at least one oxidative voltage pulse during a pulse application period occurring during the discharge cycle, the pulse application period being only a portion of the discharge cycle;
    controlling pulse characteristics during the pulse application period, the pulse characteristics configured to affect a morphology of lithium sulfide forming on the sulfur-containing cathode during discharge; and
    continuing with the discharge cycle when the pulse application period is completed.

12. The method of claim 11, wherein the pulse application period is between depths of discharge of 50% to 80%.

13. An apparatus for discharging a lithium-sulfur battery having at least one unit cell comprising a lithium-containing anode and a sulfur-containing cathode with an electrolyte layer there between, the apparatus comprising:
a memory; and
a processor configured to execute instructions stored in the memory to electrochemically treat a surface of the sulfur-containing cathode during discharge of the battery, the instructions comprising:
commencing a discharge cycle during normal operation of the lithium sulfide battery;
applying at least one oxidative voltage pulse during a pulse application period occurring during the discharge cycle, the pulse application period being only a portion of the discharge cycle;
controlling pulse characteristics during the pulse application period, the pulse characteristics configured to affect a morphology of lithium sulfide forming on the sulfur-containing cathode during discharge; and
continuing with the discharge cycle when the pulse application period is completed.

14. The apparatus of claim 13, wherein the pulse application period is between depths of discharge of 50% to 80%.

15. The apparatus of claim 13, wherein the at least one oxidative voltage pulse is superimposed and discharge of the battery is unaffected.

16. The apparatus of claim 13, wherein the pulse characteristics include a number of pulses, a frequency of pulses, a pulse duration, a peak voltage, a peak duration, a pulse shape, and a valley duration.

17. The method of claim 11, wherein a length of the pulse application period during the discharge cycle increases based on an increase in a number of discharge cycles the lithium-sulfur battery has experienced.

* * * * *